US008670157B2

(12) United States Patent  
Malik et al.

(10) Patent No.: US 8,670,157 B2
(45) Date of Patent: Mar. 11, 2014

(54) DOT GROWTH SYSTEM AND METHOD

(75) Inventors: Amal Malik, Pittsford, NY (US);
Zhenhuan Wen, Pittsford, NY (US);
Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 38 days.

(21) Appl. No.: 13/547,765

(22) Filed: Jul. 12, 2012

(65) Prior Publication Data

US 2014/0016140 A1  Jan. 16, 2014

(51) Int. Cl.
*G06K 15/00* (2006.01)

(52) U.S. Cl.
USPC ........... 358/3.12; 358/1.9; 358/2.1; 358/3.01; 358/3.04; 358/3.22; 358/3.26; 358/1.2

(58) Field of Classification Search
None
See application file for complete search history.

(56) References Cited

U.S. PATENT DOCUMENTS

| | | |
|---|---|---|
| 5,634,088 A | 5/1997 | Banton |
| 5,659,399 A | 8/1997 | Lin et al. |
| 5,859,955 A | 1/1999 | Wang |
| 6,332,044 B1 | 12/2001 | Loce et al. |
| 6,389,163 B1 | 5/2002 | Jodoin et al. |
| 7,406,210 B2 | 7/2008 | Handley et al. |
| 2006/0197992 A1 | 9/2006 | Wang |
| 2007/0091369 A1 | 4/2007 | Liu et al. |
| 2007/0201097 A1 | 8/2007 | Anderson et al. |
| 2008/0310748 A1 | 12/2008 | Arai et al. |
| 2012/0162719 A1 | 6/2012 | Klaus |

OTHER PUBLICATIONS

Notice of allowance mailed Nov. 8, 2013, in copending U.S. Appl. No. 13/547,839 (18 pages).

*Primary Examiner* — Miya J Cato
(74) *Attorney, Agent, or Firm* — Pillsbury Winthrop Shaw Pittman, LLP

(57) ABSTRACT

The present disclosure relates to a method and system for processing isolated dots of an image to be printed by a printer. The method includes detecting whether pixels corresponding to an isolated dot in the image are in an on state. A first sum of pixels that are in an on state in a first pixel ring surrounding the pixels corresponding to the isolated dot when the pixels in the isolated dot are detected to be in the on state is determined. The first sum of pixels in the first pixel ring that are in the on state is compared with a first threshold sum. A first number of pixels in at least a second pixel ring either comprising of or surrounding the pixels corresponding to the isolated dot are turned on when the first sum of pixels in the on state is less than the first threshold sum.

20 Claims, 9 Drawing Sheets

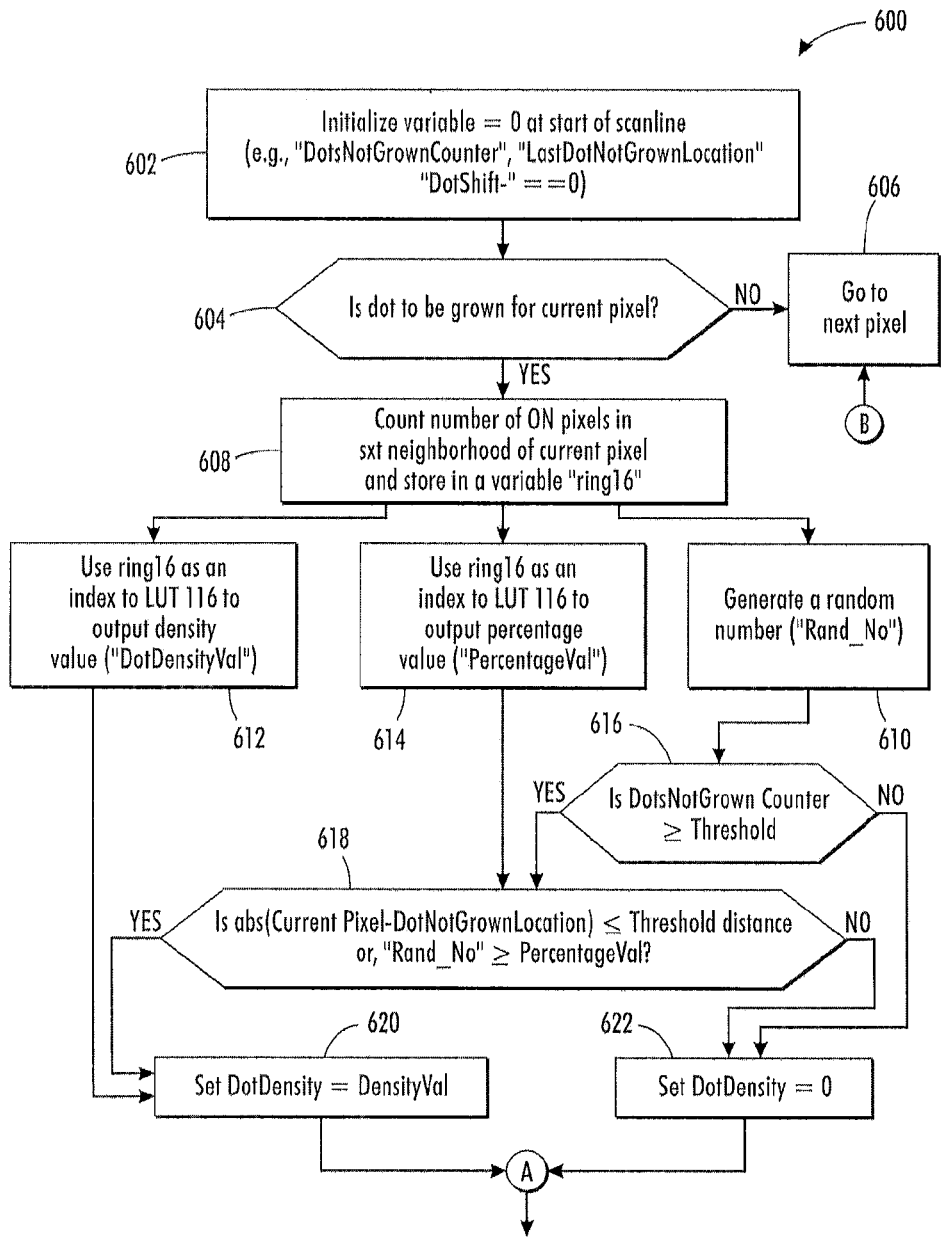
FIG. 6(Contd.)

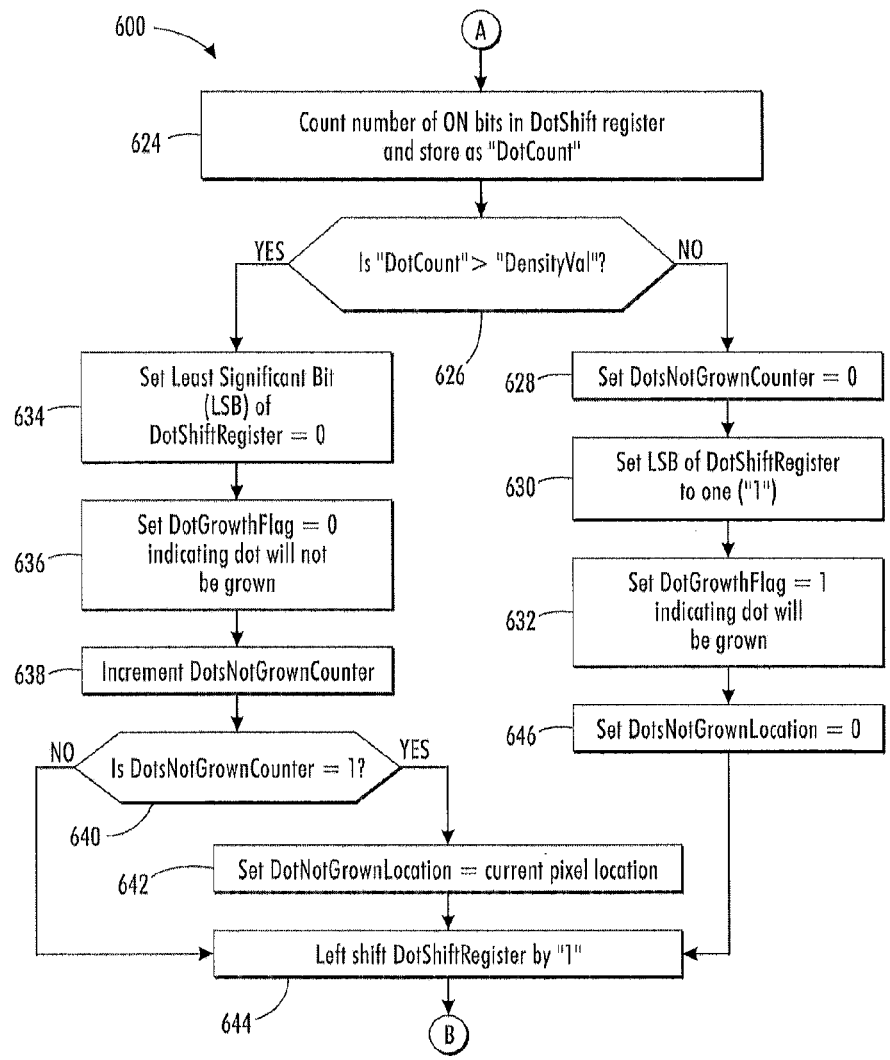
FIG. 6(Contd.)

DOT GROWTH SYSTEM AND METHOD

CROSS REFERENCE TO RELATED APPLICATIONS

This application is related to U.S. patent application entitled "DOT GROWTH SYSTEM AND METHOD," Ser. No. 13/547,802, "ISOLATED HOLE DETECTION AND GROWTH," Ser. No. 13/547,839, "ISOLATED HOLE DETECTION AND GROWTH," Ser. No. 13/547,875, "METHOD AND SYSTEM FOR ISOLATED HOLE DETECTION AND GROWTH IN A DOCUMENT IMAGE," Ser. No. 13/547,670, "METHOD AND SYSTEM FOR ISOLATED DOT DETECTION AND GROWTH IN A DOCUMENT IMAGE," Ser. No. 13/547,738, all filed concurrently with the present application, and all incorporated by reference herein in their entireties.

FIELD

The present application relates to a method and system for processing dots of an image for displaying and/or printing.

BACKGROUND

One common problem seen on xerographic marking engines is the inability to consistently or uniformly print small, isolated dots, for example, in binary bitmaps of an image. This causes image quality defects such as missing highlight tone and dotted lines. To deal with marking engines of different characteristics and to achieve the desired growth behavior in general, finer control of density adjustment is needed that can avoid inconsistent outputting of a single isolated dot in an output image. Using error diffusion, which is a popular rendering method in copy path, or using optimizing halftone design as well as other frequency modulated screening techniques such as stochastic screen, single dots may be avoided to some extent. However, inconsistent and non-uniform isolated small dots are still hard to avoid resulting in artifacts in an output image.

SUMMARY

One aspect of the present application provides a method for processing isolated dots of an image to be printed by a printer. The method includes detecting whether one or more pixels corresponding to an isolated dot in the image are in an on state, the on state defined by a higher binary logic level relative to a binary logic level corresponding to an off pixel, determining a first sum of pixels that are in an on state in a first pixel ring surrounding the one or more pixels corresponding to the isolated dot when the one or more pixels in the isolated dot are detected to be in the on state, comparing the first sum of pixels in the first pixel ring that are in the on state with a first threshold sum, turning on a first number of one or more pixels in at least a second pixel ring either comprising of or surrounding the one or more pixels corresponding to the isolated dot when the first sum of pixels in the on state is less than the first threshold sum, wherein the second pixel ring is inside the first pixel ring, and outputting the isolated dot including the turned on first number of pixels in the second pixel ring on a printable medium as an output image.

According to one aspect of the invention, a method for processing isolated dots of an image to be printed by a printer includes detecting whether one or more pixels corresponding to an isolated dot in the image are in an on state, the on state defined by a higher binary logic level relative to a binary logic level corresponding to an off pixel, determining one or more pixel distances of one or more pixels in a turned on state nearest to the one or more pixels corresponding to the isolated dot, comparing each pixel distance to a threshold pixel distance, and turning on a first number of one or more pixels either comprising of or surrounding the detected one or more pixels based upon the comparing such that the turning on is carried out when one or more of the pixel distances are greater than the threshold pixel distance for outputting the isolated dot using an image output device.

According to one aspect of the invention, a method for processing isolated dots of an image to be printed by a printer includes detecting whether one or more pixels corresponding to an isolated dot in the image are in an on state, the on state defined by a higher binary logic level relative to a binary logic level corresponding to an off pixel, determining a first sum of pixels, corresponding to a sum of dots different from the isolated dot, that are in a turned on state in at least a half scan line in one of a fast scanning and a slow scanning direction of the image, comparing the sum of pixels to a threshold sum, and turning on at least a first number of one or more pixels in at least a pixel ring comprising or surrounding the detected one or more pixels corresponding to the isolated dot when the sum of turned on pixels is less than the threshold sum for outputting the isolated dot using an image output device.

According to one aspect of the invention, a system for processing isolated dots of an image to be printed by a printer includes one or more processors. The one or more processors are configured to detect whether one or more pixels corresponding to an isolated dot in the image are in an on state, the on state defined by a higher binary logic level relative to a binary logic level corresponding to an off pixel, determine a first sum of pixels that are also in an on state in a first pixel ring surrounding the one or more pixels corresponding to the isolated dot when the one or more pixels in the isolated dot are detected to be in the on state, compare the first sum of pixels in the first pixel ring that are in the on state with a first threshold sum, turn on a first number of one or more pixels in at least a second pixel ring either comprising of or surrounding the one or more pixels corresponding to the isolated dot when the first sum of pixels in the on state is less than the first threshold sum, wherein the second pixel ring is inside the first pixel ring, and output the isolated dot including the turned on first number of pixels in the second pixel ring on a printable medium as an output image.

Yet another aspect of the present application provides a computer readable medium having stored thereon instructions for processing isolated dots of an image to be printed by a printer, which when executed by one or more processors cause the one or more processors to detect whether one or more pixels corresponding to an isolated dot in the image are in an on state, the on state defined by a higher binary logic level relative to a binary logic level corresponding to an off pixel, determine a first sum of pixels that are also in an on state in a first pixel ring surrounding the one or more pixels corresponding to the isolated dot when the one or more pixels in the isolated dot are detected to be in the on state, compare the first sum of pixels in the first pixel ring that are in the on state with a first threshold sum, turn on a first number of one or more pixels in at least a second pixel ring either comprising of or surrounding the one or more pixels corresponding to the isolated dot when the first sum of pixels in the on state is less than the first threshold sum, wherein the second pixel ring is inside the first pixel ring, and output the isolated dot including the turned on first number of pixels in the second pixel ring on a printable medium as an output image.

Other objects, features, and advantages of the present disclosed technology will become apparent from the foregoing detailed description, the accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which:

FIG. 6 illustrates a method for percentage control based isolated dot growth, according to an aspect of the present disclosure.

DETAILED DESCRIPTION

Figure 1:
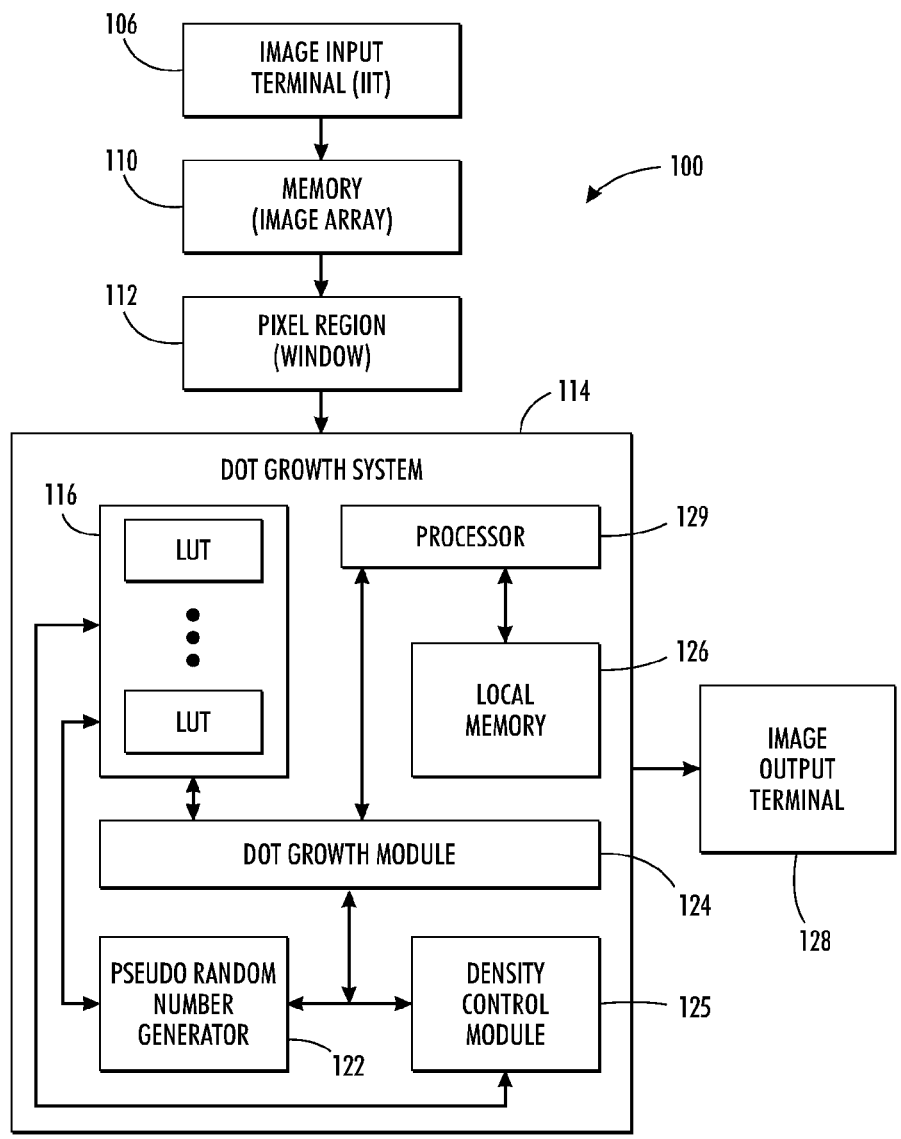
FIG. 1 illustrates a block diagram of a system for processing an input digital image for dot growth, according to an aspect of the present disclosure.

As used in this disclosure, an "image" is a pattern of physical light that in digital image processing and xerographic applications is converted to a two-dimensional array of data. Such data could be multi-bit or binary. Alternatively, the image may be defined using additional dimensions for different planes or components of the image. For example, a monochrome image has one color plane and a color image has three or four color planes. Example embodiments disclosed herein relate to both monochrome as well as color images. An image may include characters, words, and text as well as other features such as graphics, including pictures. An image may be divided into "segments," each of which is itself an image. A segment of an image may be of any size up to and including the whole image.

An item of data can be used to define an image when the item of data includes sufficient information to produce the image. For example, a two-dimensional array can define all or any part of an image, with each item of data in the array providing a value indicating the color of a respective location of the image. Likewise, one or more "scanlines" can be used to define an image. A scanline divides an image into a sequence of (typically horizontal) strips. A scanline can be further divided into discrete pixels for processing in a computer, xerographic, or printing system. This ordering of pixels by rows is known as raster order, or raster scan order.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. A "central pixel" is not literally the center pixel in a region, rather the term describes a target pixel in a scanline being a single pixel or having a plurality of pixels. It will be appreciated that many or all of the pixels become the "central" or "target" pixel during the process of enhancing an entire image. Generally, the pixels make up individual features of the image. A binary pixel can take on two values: a 1 or a 0, 1 meaning ON and 0 meaning OFF. Specifically, one or more pixels that are ON and are contiguous or in close vicinity of each other define one or more dots that are to be printed by a printing device. The illustrated aspects of this disclosure relate generally to a system, a method, and a computer readable medium having stored thereon instructions for selectively processing isolated dots of an image to be printed by the printing device. In some aspects of the disclosure, one or more pixels may make a dot, e.g., an isolated dot as described herein.

The term "ON state" of a pixel is defined with respect to the pixel having a binary logic level higher than that of a pixel with a lower binary logic level. For example, a pixel that is at a "1" level is in an ON state as compared to a pixel at a '0' binary level or an "OFF state." The ON and OFF states of the pixels can be stored in a register in a memory device, although forms of physical storage may be used.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." An N-bit item of data has one of $2^N$ values, where N is an integer value. A "multi-bit" item of data is an item of data or signal that includes more than one bits. The bits of a binary number are ordered in sequence from Most Significant Bit (MSB) to Least Significant Bit (LSB) or vice versa. As used herein, "left" and "leftward" arbitrarily refer to a direction toward an MSB in sequence while "right" and "rightward" arbitrarily refer to a direction toward an LSB in sequence.

The term "data" includes data existing in any physical form, and includes data that are transitory or are being stored or transmitted. For example, data could exist as electromagnetic or other transmitted signals or as signals stored in electronic, magnetic, or other form.

An item of data relates to a part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image. A "neighborhood operation" is an image processing operation that uses data relating to one part of an image to obtain data relating to another part of an image.

Pixels are "neighbors" or "neighboring" within an image when there are no other pixels between them or if they meet an appropriate criterion for neighboring. For example, using a connectivity criterion if the pixels are rectangular and appear in rows and columns, each pixel has a total of 8 neighboring pixels contiguous with the pixel of interest.

Another criterion for defining a "neighborhood" includes selecting a threshold distance between two pixels that are enabled or in an ON state for printing or display, as discussed below. Yet another criterion includes counting a threshold number of pixels in an s×t window surrounding the pixel of interest, s and t each being integers.

An "image input device" is a device that can receive an image and provide an item or items of data defining a version of the image. A desktop "scanner" is an example of an image input device that receives an image by a scanning operation, such as by scanning a document. The resulting scanned document will have an input density of pixels. Scanning is carried out using, for example, a scanning bar in the mage input device. The scanning bar scans the input image on a line by line basis. The direction in which the scanning bar scans the image is termed as a "fast scan" direction at the beginning of each scanline of the image. A second direction is termed as a "slow scan" direction that corresponds to a direction of movement of a printable medium (e.g., sheet(s) of printing paper) storing the image. The adjectives "fast" and "slow" refer to relative speed of movement of the scan bar and the printable medium.

An "image output device" is a device that can receive an item of data defining an image and provide the image as output. A "display" and a "laser printer" are examples of image output devices that provide the output image in human viewable form, although any type of printing device known to one of ordinary skill in the art may be used. The resulting output image will have an output density of pixels. The visible pattern presented by a display is a "displayed image" or simply "image" while the visual pattern rendered on a substrate by the printer is a "printed image". The output image is printed using movement of one or more components in the image output device.

"Circuitry" or a "circuit" is any physical arrangement of matter that can respond to a first signal at one location or time by providing a second signal at another location or time. Circuitry specifically includes logic circuits existing as interconnected components, programmable logic arrays (PLAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, EPROMs, EEPROMs, RAMs, and storage medium access devices with data storage media that they can access. A "memory cell" is memory circuitry that can store a single unit of data, such as a bit or other n-ary digit or an analog value.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

For purposes of this disclosure, and not by way of limitation, an "isolated dot" is generally defined as a dot that satisfies one or more criteria such as how close that dot is to the nearest pixel or group of pixels corresponding to another dot. Similarly, an isolated dot may be defined as a dot that has a threshold number of dots surrounding that dot that are enabled for printing. Other criteria for defining an isolated dot may be used too. The system may be generically considered a printing system having an input image that is processed for printing or displaying as an output image. The input image has an input density of dots with one or more pixels in an ON state making up the input image. Correspondingly, the output image has an output density or a desired density of dots making up the output image. Typically, input and output densities are different since input density of dots is optimized for removing artifacts to result in the output density of dots.

"Dot growth" generally refers to a process in which a size of an isolated dot that does not meet a threshold size criterion suitable for outputting is increased. For example, such increase in size may be reflected by selecting one or more pixels in a neighborhood of the detected dot and enabling those pixels for outputting or printing.

Referring to FIG. 1, a there is depicted a partly functional and partly schematic diagram of an aspect of the present technology. An aspect of the present disclosure is employed as a system 100 for processing an input digital image generated and/or provided by an Image Input Terminal (IIT) 106 to optimize growth of isolated dots therein. By way of example only, input image can be provided as a plurality of binary data signals representing, for example, the text, halftone and graphic image regions that make up a source document from with the input image was generated, or is being generated in real-time. That is, the input image may be produced as a digitized representation of a hardcopy document, for example, by scanning on a scanner. As illustrated in FIG. 1, the source of the digital image (interchangeably referred to herein as "input image") may be any IIT, where the image is passed to or stored in memory 110. Alternatively, the term "input image" may be used to describe an image that is input to a dot growth system 114, described below. Memory 110 may be suitable for the storage of the entire image or it may be designed to store only a portion of the image data (e.g., several rasters or fast-scan lines). More specifically memory 110 stores data that is representative of the imaging areas in the digital image. Memory 110 can comprise computer readable media, namely computer readable or processor readable storage media, which are examples of machine-readable storage media. Computer readable storage/machine-readable storage media can include volatile, nonvolatile, removable, and non removable media implemented in any method or technology for storage of information, e.g., computer readable/machine-executable instructions, data structures, program modules, or other data, which can be obtained and/or executed by one or more processors.

Memory 110 is a generic term and it may comprise a single memory or a plurality of separate memories. Such memories refer to computer readable media, and may be of the type that are removable from the camera, or of the type that are integrated into IIT 106 (e.g., a camera). Examples of such memory may include, but are not limited to flash memory, USB thumb drives, a memory stick, CDs, DVDs or other optical recording media, floppy disks or other magnetic recording media, or any other type of memory now known or later developed. Where memory 110 comprises a single memory, the input image may be stored separately in memory 110. Likewise, the lower resolution images could be stored to a first memory and the higher resolution images could be stored to a physically separate second memory.

The data may be extracted from memory 110 on a raster basis or on a pixel-by-pixel basis for use by the subsequent components or steps. More specifically, a pixel region window block 112 (referred to as window 112) serves to select some or all pixels within a region of the image (accesses or extracts from memory 110), so as to make the data for the respective pixels available for processing. It will be appreciated that while described as a static system, the disclosed embodiment is intended to continuously operate on pixel data in a "streaming" fashion, and that window 112 may be any suitable apparatus or methodology that allows access to a plurality of pixels.

As described herein, window 112 determines different regions of the digital image, the regions including a plurality of imaging areas. Such regions are suitable for optimizing and controlling growth of isolated dots therein. According to one aspect of the disclosure, such windowing may include a plurality of fast-scan data buffers, wherein each buffer contains a plurality of registers or similar memory cells for the storage of image data therein, with the data being clocked or otherwise advanced through the registers. The number of registers is dependent upon the "horizontal" (fast-scan) window size and/or line width, whereas the number of buffers is dependent upon the "vertical" (slow-scan) window size. As will be appreciated, the window size is dependent upon a context, as discussed in FIG. 2 below, that is required to implement the particular image adjustment desired and the level of addressability of the imaging areas (higher levels of addressability will inherently result in more data stored to provide the required context). While one windowing technique has been generally described, it will be appreciated that similar means may be implemented using hardware and/or software to point/access a memory device, so that data for selected imaging areas may be accessed, rather than having the data separately stored in a buffer. It will also be appreciated that alternative configurations may be employed for the buffer. For example, a single, long, buffer may be employed, where image data is simply clocked through the buffer. Thus the various alternatives all employ some form of memory for storing image data representing image areas in at least one region of the image.

Output from window 112 is provided to dot growth system 114. Dot growth system 114 includes one or more look-up tables (LUTs) 116, a dot growth module 124 communicably coupled to a pseudo-random number generator 122 (interchangeably referred to as random number generator 122) and a density control module 125 as shown by example connecting arrows, a processor 124, a local memory 126, and other logic circuitry (not shown). In one alternative aspect of this disclosure, LUTs 116 may be a part of local memory 126. Dot growth system 114 carries out various functions and methods related to detection and growth of isolated dots in an input image provided by IIT 106, and received by dot growth system 114 as a bitmap of pixels from window 112 and provided to an Image Output Terminal (IOT) 128 as an input for display and/or printing purposes. Dot growth module 124, random number generator 122, and density control module 125 may be implemented using hardware (e.g., memory, registers, and circuits). Alternatively, dot growth module 124, random number generator 122, and density control module 125 may be software modules with code residing upon tangible computer readable medium to carry out various features and functions related to dot detection and growth. Further, dot growth module 124, random number generator 122, and density control module 125 may be a combination of hardware and software, as may be contemplated by one of ordinary skill in the art. By way of example only, and not by way of limitation, processor 124 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts. For example, processor 124 can be a PENTIUM® processor provided by Intel Corporation, Santa Clara, Calif. Further, although a single processor is illustrated, more than one processors coupled by a bus may be used. Local memory 126 is similar to memory 110 and therefore, structure of local memory 126 is not being described in detail.

After processing at dot growth system 114 (e.g., using processor 124), input image is transformed into an output image for printing and/or displaying at IOT 128. IOT 28 comprises a display unit (not shown) for displaying output image, although in alternative embodiments, IOT 128 could also print the output image (e.g., when IOT 128 is at a print end of a copier). As will be appreciated, additional LUTs and storage and logic circuitry may be used for producing the output image at IOT 128.

Figure 2A:
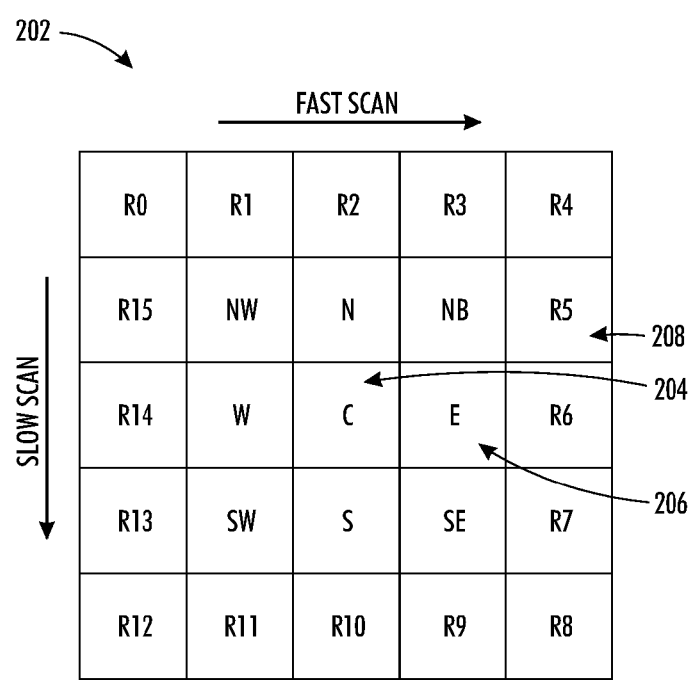
FIG. 2A illustrates a context window, according to an aspect of the present disclosure.

Referring to FIG. 2A, a context window 202 with respect to a fast scan and a slow scan direction is shown. Context window 202 includes a center pixel or a target pixel 204, an inner row or ring of pixels 206, and an outer row or ring of pixels 208 surrounding or in the neighborhood of center pixel 204. In one aspect, context window 202 is a part of an input image that comprises a plurality of scanlines that are further made of a plurality of context windows, similar to context window 202. Pixels shown in context window 202 can be represented as a matrix (or other known data structure) by at least one binary value ("0" or "1"). A high binary value (e.g., "1") indicates that the pixel is enabled for outputting (printing and/or displaying), and a low binary value (e.g., "0") indicates that the pixel will not be printed or displayed in an output image outputted by IOT 128. Therefore, context window 202 may be represented as a comprising a bitmap of binary values stored, for example, in a register in memory 110. In the example shown in FIG. 2, inner ring 206 is a 3×3 pixel ring where pixels are denoted as "N," "S," "E," "W," "NE," "NW," "SE," and "SW" in terms of their location relative to center pixel 204. The pixels in the inner 3×3 window are used to form an index to a programmable 256-entry G-bit look up table in look up tables 116 (e.g., LUT1). Such an index can be defined as: index={NW, N, NE, W, E, SW, S, SE}, although other formats for defining the index may be used. For example, the order of pixels forming the index may be changed. The look up table indexed by the index is used for detection of center pixel 204 at beginning of each scanline of the input image. For example, the MSB of the 6-bit detection look-up table ("detectionLUT") determines a region of the input image to which context window 202 belongs. The remaining 5 bits of the 6-bit detectionLUT are used to obtain one or more matching templates that will be used to output image on IOT 128 and will form an output image context window that may replace context window 202. For example, when a value of the remaining 5-bits is greater than 31, center pixel 204 is skipped and is not detected for dot growth of the dot in the input image corresponding to either a center pixel 204 or any of its adjacent neighboring pixels. In such a scenario, context window 202 will be unchanged in the output image. As will be appreciated by one of ordinary skill in the art, additional criteria may be applied toward determining whether or not center pixel 204 will be detected for dot growth. Such additional criteria for inner ring 206 pixel values are disclosed in related U.S. patent application entitled "DOT GROWTH SYSTEM AND METHOD," Ser. No. 13/547,802 referenced above, filed concurrently with the present application, the disclosure of which is incorporated by reference herein in its entirety. An example of such criteria is described in FIG. 2B.

Figure 2B:
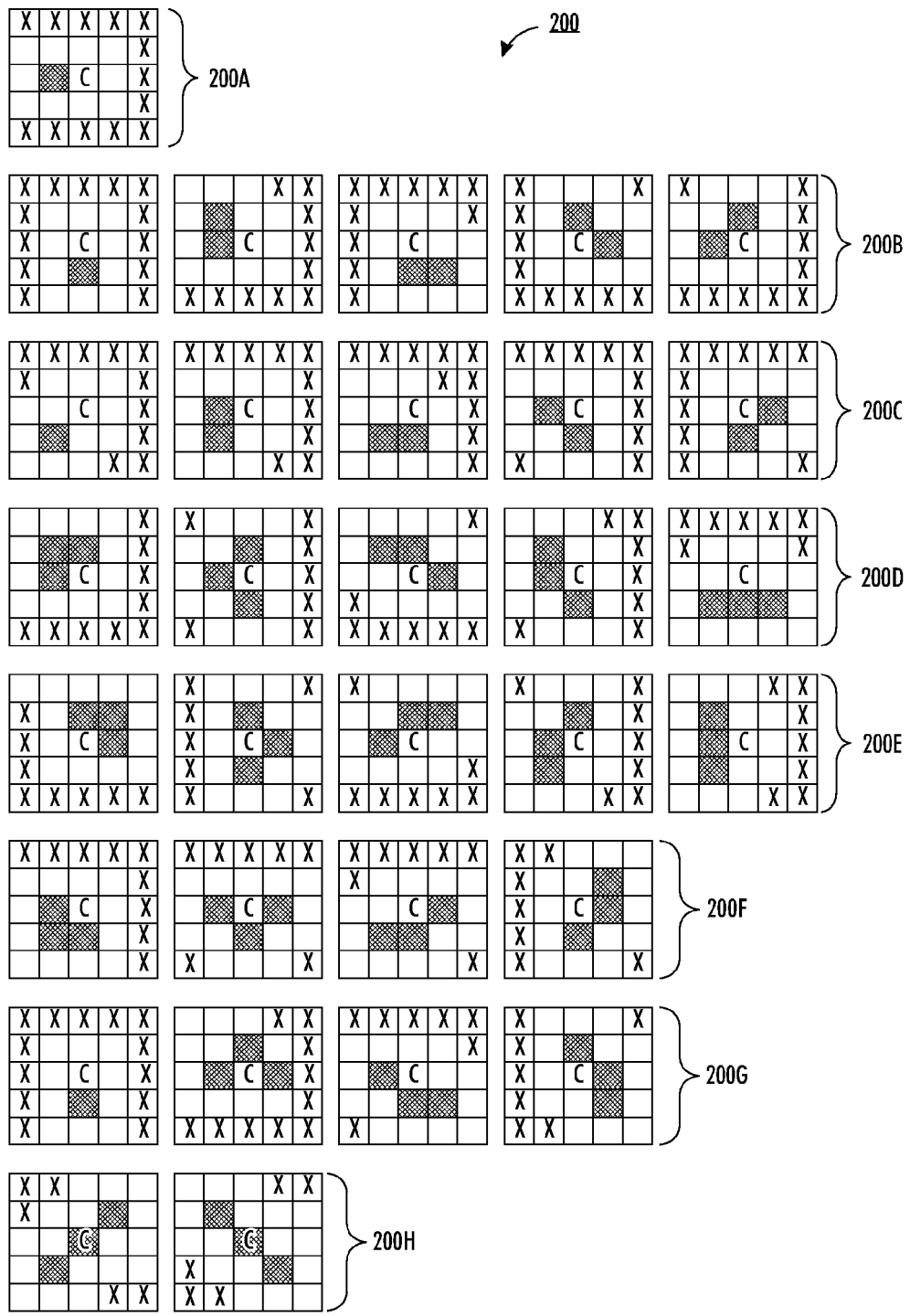
FIG. 2B illustrates an example set of patterns or templates for isolated dot detection, according to an aspect of the present disclosure.

Referring to FIG. 2B, an exemplary set of patterns 200 may be used in isolated dot detection. For example, if the specified minimum dot size is two after growth then only a row 200A showing a single pattern is used. Similarly, if the dot size after growth is to be three pixels, row 200A and a row 200B of patterns are used. If the dot size after growth is specified as four pixels, then all the patterns 200 in rows 200A-200H in FIG. 2B are searched for use as template for dot detection. If all the growth of up to three pixels is to be enabled but the growth from a three-pixel dot to a four-pixel dot is to be controlled, for example, growth recording and disablement of pixels may be invoked only when patterns starting from a row 200C are detected. Similarly, if all growth to two pixels is to be enabled but growth to three pixels is to be controlled, growth recording and disablement may be invoked only when patterns in row 200B in FIG. 2B are detected. Additional examples of templates used for dot detection may be found in related U.S. patent application entitled "METHOD AND SYSTEM FOR ISOLATED DOT DETECTION AND GROWTH IN A DOCUMENT IMAGE," Ser. No. 13/547,738 filed concurrently with the present application, the disclosure of which is incorporated herein by reference in its entirety.

Referring back to FIG. 2A, in the example shown, the pixels from outer ring 208 of the 5×5 window are arranged in a 16-bit array as {R0, R1, R2, R3, R4, R5, R6, R7, R8, R9, R10, R11, R12, R13, R14, R15}, although other numbers and/or other orderings of pixels may be used. In one aspect of the disclosure, a number of "ON" pixels surrounding current pixel 204 are counted using processor 124. The "ON" state pixels correspond to one or more dots in the input image that are already enabled. Although the counting is carried out for outer ring 206 in 5×5 context window 202, any window of size s×t within a neighborhood of current pixel 204 may be used, where s and t are integers. By way of example only, the 16-bit array may be stored in a register of memory 110.

Various aspects of the present disclosure effectively deal with a variety of artifacts introduced in growth of dots in an image to be outputted by IOT 128, and to better accommodate marking engines of different characteristics by using finer and more flexible control of dot growth. Some examples of such artifacts include missing groups of scanline in the output image, and lower than a desired density of dots in each scanline of the output image outputted by IOT 128. As discussed with respect to flowcharts 300-600 in FIGS. 3-6 below, the enabling of dot growth in various regions of an image (e.g., highlights, known to one of ordinary skill in the art) is determined by using percentage control of a number of enabled pixels in conjunction with output density control of different regions of the image based upon an input density of the input image obtained from IIT 106. The image is subsequently stored in memory 110 as an n-dimensional image array, n being an integer greater than zero (0). Such a percentage can either be a function of the number of dots not grown in the neighborhood of the current pixel, or it can be controlled using a random number generator. In some aspects of the disclosure, the percentage can be a function of both a random number and a number of dots not grown. As can be appreciated, the output image at IOT 128 will have dot density dependent upon the technique or the combination of techniques used.

The various functions of the elements of system 100 may be controlled by a central microprocessor (e.g., processor 124), and the instructions to carry out the exemplary methodology may be embedded in a chip, or may be loaded into a memory associated with the microprocessor as software. Such features and functions are illustrated and described with reference to the flowcharts herein, and the steps in the flowcharts are by way of example only and not by way of limitation. For example, steps may be interchanged, combined, or added to implement various features and functionalities of the technology in this disclosure. The particular manner in which the elements of system 100 are controlled and the method or process of the flowcharts is performed is not particularly critical, and other control structure or architecture may be used for system 100.

Figure 3:
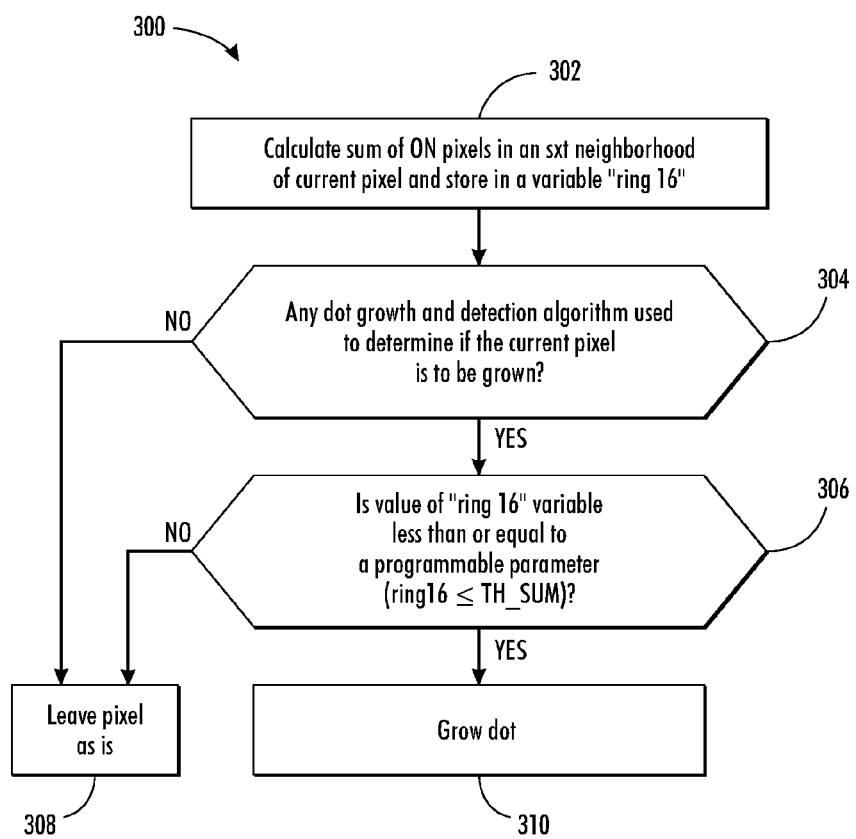
FIG. 3 illustrates of a flowchart of method for density control based isolated dot growth, according to an aspect of the present disclosure.

Referring to FIG. 3, an example process for density control of output dots based upon the number of ON pixels in the neighborhood of detected isolated dots in an input image is described using flowchart 300.

In block 302, processor 124 counts a number of pixels that are in an ON state in a neighborhood of center pixel 204. For example, processor 124 can count a number of ON pixels in outer ring 208 surrounding center pixel 204. Alternatively, processor 124 can count a total number of ON pixels in an s×t neighborhood of center pixel 204, where s and t are integers. The number determined from such counting is stored in local memory 126 of dot growth system 114 as a variable ("ring16"). The number of pixels in an ON state in the neighborhood of current pixel 204 define an input density of the input image for each pixel of each scanline making up the input image.

In block 304, processor 124 determines if current center pixel 204 was detected to be grown by a dot detection and growth algorithm. For example, processor 124 may check such detection using FIG. 2B, although any other form of dot detection and growth algorithm may be used. If yes, the flow proceeds to block 306. If no, the flow proceeds to block 308.

In block 306, processor 124 determines if the value of ring16 variable determined in block 302 is less than or equal to a programmable parameter or threshold value ("TH_SUM"), the flow proceeds to block 310. For example, value of ring16 may be based on pixels in a first ring (e.g., outer ring 208) or a second ring (e.g., inner ring 206), although other neighborhoods beyond such rings or rows may be used. If not, the flow proceeds to block 308.

In block 308, if processor 124 determines that center pixel 204 was not detected as a pixel for dot growth, current center pixel is left as is in its current state. Such marking comprises updating registers and flags stored in local memory 126 indicating that center pixel 204 will not be used for dot growth. In one example, processor 124 may revert to step 302 for a next pixel after block 308.

In block 310, current center pixel 204 is grown by turning ON a pixel value. Such enabling comprises marking pixels neighboring center pixel 204 to an ON state resulting in an enlarged dot comprising one or more pixels that may include center pixel 204 and additional pixels surrounding center pixel 204 (e.g., one or more contiguous or non-contiguous pixels from inner ring 206 and outer ring 208). Corresponding updates may be made to registers and flags stored in local memory 126 indicating a growth of a dot corresponding to center pixel 204.

Figure 4:
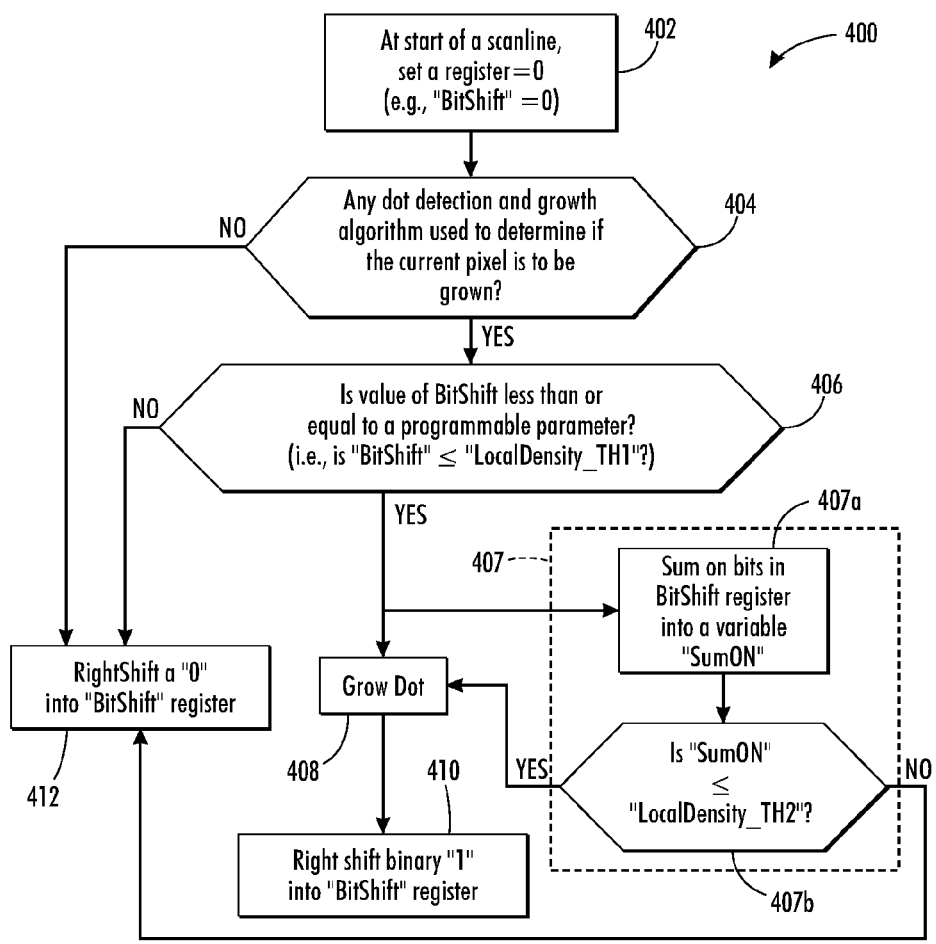
FIG. 4 illustrates a flowchart of another method for density control based isolated dot growth, according to an aspect of the present disclosure.

Referring to FIG. 4, an example process for density control of output dots based upon grown isolated dots in the neighborhood of the current isolated dot (e.g., center pixel 204) in an input image is described using flowchart 400.

In block 402, at start of each scanline of the input image, processor 124 sets a register in local memory 126 to zero. For example, a register used for bit shifting purposes ("BitShift") may be set to all zeros. In one example, 8-bit register BitShift is used to keep track of the pixels turned ON in the fast scan direction, although other sizes of BitShift register in other scan directions may be used.

In block 404, processor 124 determines if current center pixel 204 was detected to be grown by a dot detection and growth algorithm. For example, processor 124 may check such detection using FIG. 2B, although any other form of dot detection and growth algorithm may be used. If yes, the flow proceeds to block 406. If not, the flow proceeds to block 412.

In block 406, processor 124 determines if value of BitShift register is less than or equal to a programmable parameter ("LocalDensity_TH1"). If yes, the flow proceeds to block 408, and if no, the flow proceeds to block 412.

In one variation of the process shown by flowchart 400, after block 406, the flow proceeds to block 407 including blocks 407a and 407b. In block 407a, when the condition in block 406 is satisfied, processor 124 determines a sum of all ON bits in BitShift register and stores the sum in a variable ("SumOn"). In block 407b, processor 124 determines if this sum stored in variable SumOn is less than or equal to the local density threshold variable "LocalDensity_TH2". If yes, the flow proceeds to block 412, and if not, the flow proceeds to block 408.

In block 408, current center pixel 204 is grown by turning ON a pixel value. Such enabling comprises marking pixels neighboring center pixel 204 to an ON state resulting in an enlarged dot comprising one or more pixels that may include center pixel 204 and additional pixels surrounding center pixel 204 (e.g., one or more contiguous or non-contiguous pixels from inner ring 206 and outer ring 208). Corresponding updates may be made to registers and flags stored in local memory 126 indicating a growth of a dot corresponding to center pixel 204.

In block 410, the BitShift register is updated by right shifting a binary "1" into BitShift register.

In block 412, when the dot is not to be grown, the BitShift register is updated by right shifting a binary "0" into BitShift register.

Figure 5:
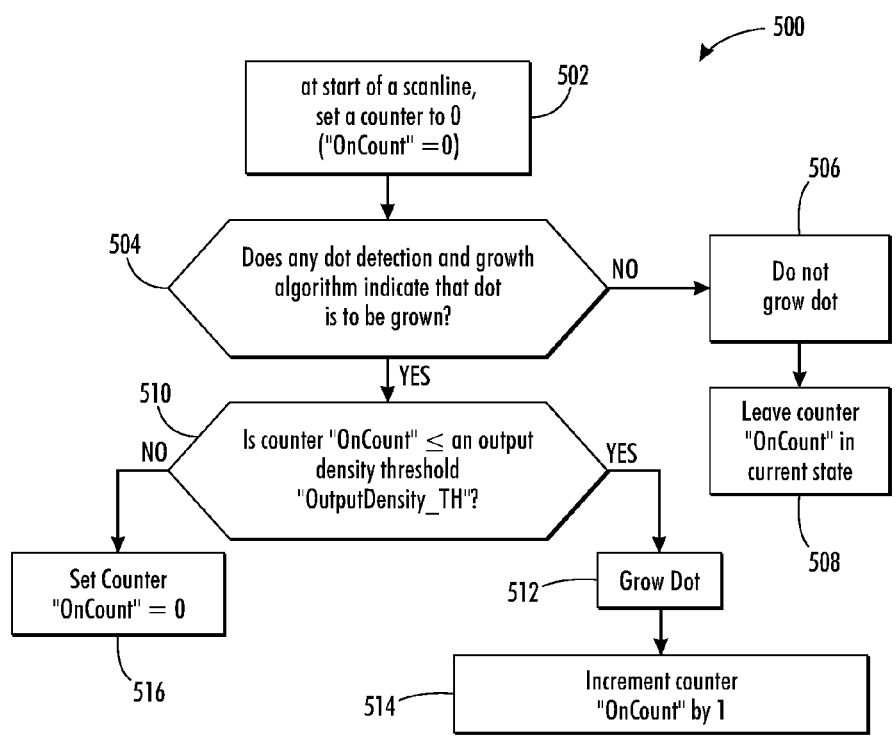
FIG. 5 illustrates a flowchart for a scenario when dots are grown based on density control, according to an aspect of the present disclosure.

Referring to FIG. 5, an example process for density control of output dots based upon density of grown dots in the current scanline, which would be the scanline of the current detected isolated dot, in an input image is described using flowchart 500.

In block 502, at start of each scanline of the input image, a counter ("OnCount") is set to zero. In one example, such a counter may be a 4 bit counter with binary values stored therein, although other types of counters implemented using processor 124 and local memory 126 may be used.

In block 504, processor 124 determines if current center pixel 204 was detected to be grown by a dot detection and growth algorithm. For example, processor 124 may check such detection using FIG. 2B, although any other form of dot detection and growth algorithm may be used. If yes, the flow proceeds to block 510. If not, the flow proceeds to block 506.

In block 506, center pixel 204 is not marked for growth and in block 508, processor 124 leaves counter OnCount in current state without altering its contents.

In block 510, when center pixel 204 is determined to be selected for dot growth, processor 124 determines whether or not the value stored in counter OnCount is less than or equal to an output density threshold ("OutputDensity_TH"). In one example, OutputDensity_TH may be a 5-bit programmable register. If the counter value is less than the threshold, the flow proceeds to block 512. If the counter value is not less than the threshold, the flow proceeds to block 516.

In block 512, current center pixel 204 is grown by turning ON a pixel value. Such enabling comprises marking pixels neighboring center pixel 204 to an ON state resulting in an enlarged dot comprising one or more pixels that may include center pixel 204 and additional pixels surrounding center pixel 204 (e.g., one or more contiguous or non-contiguous pixels from inner ring 206 and outer ring 208). Corresponding updates may be made to registers and flags stored in local memory 126 indicating a growth of a dot corresponding to center pixel 204.

In block 514, after current center pixel 204 is grown, processor 124 increments counter OnCount by one to indicate that current pixel 204 was grown.

In block 516, when the condition in block 510 is not satisfied, processor 124 resets counter OnCount to zero.

Flowchart 300 and 400 offer local density control for each pixel whereas flowchart 500 provides density control for a full scanline. Further, flowchart 300 checks the input density of the image whereas flowcharts 400 and 500 look at the output density of the image. The methodologies disclosed in flowcharts 300-500 modify the desired output density based on the input and/or output dotgrowth density in some local or global neighborhood of the current detected isolated dot to obtain an optimal output image for printing and/or display by IOT 128.

It is to be noted that the bit depths specified for the registers described above are typical values and other values are possible. By setting the programmable thresholds accordingly, only flowchart 300 may be carried out by processor 124, only flowchart 400 may be carried out by processor 124, or only flowchart 500 may be carried out by processor 124. Further, processor 124 may carry out any combination of the three adjustments of dot density illustrated by the processes of flowcharts 300-600. Furthermore, although flowcharts 400 and 500 are carried out by processor 124 in the fast scan direction only to keep the implementation simple, other variant implementations in other scan directions (e.g., slow scan direction) may be additionally or optionally carried out by processor 124. The adjustments described by the processes of flowcharts 300-500 can be invoked at different stages of dot growth.

FIG. 6 illustrates an example process for enabling dot growth in various regions on the input image (e.g., in highlight regions) by using a percentage control method described using flowchart 600.

In block 602, at start of each scanline of the input image, initialization of various counters and registers in memory 110 and/or local memory 126 is carried out. For example, a counter that counts a number of pixels that were initially enabled for dotgrowth based on some isolated dot detection and growth algorithm but were later disabled for dot growth is initialized to a number "0" at start of each scanline ("DotsNotGrown=0"). Likewise, location of a first center pixel or target pixel is recorded into a variable identifier "DotsNotGrownLocation" for which a binary dotgrowth flag was initially set but is later reset to a binary "0". Likewise, a register (e.g., a "DotShift" register) storing density control values is initialized to zero. Density control value is used to control the local density of the dots grown in some neighborhood of the current pixel (e.g., center pixel 204).

In block 604, for each pixel in the scanline (e.g., current center pixel 204), processor 124 determines whether or not the pixel is in an ON state, or is enabled for printing. For example, processor 124 may determine whether or not a dot corresponding to the current pixel is to be grown. This may be indicated by setting a flag (e.g., "dotgrowthflag=1"). If not, processor 124 in dot growth system 114 goes to the next pixel, as indicated in block 606 and checks for the condition in block 604 again for the next pixel. As noted earlier, one or more pixels (e.g., center pixel 204) can correspond to one or more dots in the input image. Dots in the input image determine an input density of dots (and therefore, pixels). Likewise, the output image has a corresponding output density of dots that is desired to overcome or remove the artifacts in the input image.

In block 608, processor 124 counts a number of pixels that are in an ON state in a neighborhood of center pixel 204. For example, processor 124 can count a number of ON pixels in outer ring 208 surrounding center pixel 204 and store this number in a variable ("ring16"). Alternatively, processor 124 can count a total number of ON pixels in an s×t neighborhood of center pixel 204, where s and t are integers. The number determined from such counting is stored in local memory 126 of dot growth system 114. The number of pixels in an ON state in the neighborhood of current pixel 204 define an input density of the input image for each pixel of each scanline making up the input image. This number is then used to obtain values between $-2^n$ to $2^n$ in a look-up table discussed with respect to block 614 below. Upon determining the number of ON pixels, processor 124 carries out the processes of blocks 610, 612, and 614 in parallel, although in some examples these processes may be carried out in series.

In block 610, using random number generator 122, processor 124 generates a random number. In one aspect of this disclosure, the generated random number is in a finite range of $-2^m$ to $2^m$, where m is an integer, although other ranges may be used. An exemplary value of m is 9, although other values may be used. It is to be noted that any technique of generating random numbers known to those of ordinary skill in the art could be used, and the present disclosure is not limited to any particular technique of generating random numbers. For example, the random number could be a "true" random number or a pseudo-random number, and may be generated by one or more computational techniques known to one of ordinary skill in the art implemented using processor 124.

In block 612, the value of ring16 from block 608 is used as an index to one or more LUTs 116 to output a density control value that is used as a threshold against the density of grown dots in some neighborhood of the current isolated dot (e.g., center pixel 204).

In block 614, the number of ON pixels counted in block 608 is used to generate a percentage value for enabling a number of pixels for dot growth in a plurality of pixels making up the scanline. Such percentage value may be obtained from a look-up table mapping values from the look-up table (LUT) that maps values between values of "ring16" and $-2^n$ to $2^n$ for percentage control. The output of the LUT which are the percentage control values determine a percentage of enabled pixels out of a total number of enabled pixels in the scanline that will be selectively enabled for dot growth by dot growth system 114, and outputted by IOT 128. An exemplary table is shown as Table I below, although tables with other values may be developed:

TABLE I

| Pixels in ON state in outer ring 208 | LUTs 116 output Percentage control Values | Percentage of Pixels enabled for dot growth |
|---|---|---|
| 0 | −256 | 100 |
| 1 | −192 | 87.5 |
| 2 | −128 | 75 |
| 3 | −64 | 62.5 |
| 4 | 0 | 50 |
| 5 | 64 | 37.5 |
| 6 | 128 | 25 |
| 7 | 192 | 12.5 |
| 8-15 | 256 | 0 |

For example, using the above table, if no pixels in the neighborhood of the current isolated dot detected and enabled for growth are in an ON state, a 100% of these enabled pixels will be grown based on this criteria only, although additional criteria (as discussed below) may reduce the percentage value Likewise, if 5 pixels in outer ring 208 are ON, then about 37.5% of enabled pixels are selectively enabled in the output image outputted by IOT 128. As seen from Table I above, more than one (e.g., two or more) values for number of pixels in outer ring 208 that are in an ON state may correspond or map to the same percentage value of pixels that are to be enabled in the output image. Further, it is to be noted that the selected percentage of pixels can be less than 100% indicating that not all pixels corresponding to one or more isolated dots will be grown. The flow proceeds to block 618.

In block 616, processor 124 compares if a number of dots that were enabled for dot growth based on some isolated dot detection and dot growth algorithm but were not grown in a past context with respect to current center pixel 204 is greater than or equal to a threshold number. If not, the flow proceeds to block 622. If yes, the flow proceeds to block 618.

In block 618, processor 124 determines if location of current center pixel 204 is less than or equal to a threshold distance from a location of the last dot that was supposed to be grown based on some isolated dot detection and growth algorithm but was not grown as discussed below in blocks 642 and 646. Processor 124 may carry out this determination by calculating an absolute value of the difference between a current center pixel 204 and a "DotsNotGrown" variable initialized in block 602. Alternatively or additionally, processor 124 may determine if the random number generated in block 610 is greater than the percentage value obtained from Table I above. If either of these conditions in block 618 is true, the flow proceeds to block 620, else the flow proceeds to block 622.

In block 620, processor 124 sets a dot density value equal to a density control value obtained from block 612.

In block 622, processor 124 sets the dot density value equal to zero. As a result, blocks 620 and 622 are used to perform density control in two different ways (used alone or as a combination of the two respective separate techniques).

The flow from blocks 620 and 622 then proceeds to block 624.

In block 624, processor 124 counts a number of ON bits in the DotShift register of block 602. This count may be stored in a variable "DotCount" in local memory 126.

In block 626, processor 124 determines if the value of variable DotCount is greater than the value of the variable DotDensity of blocks 620 and 622. If yes, the flow proceeds to block 634. If no, the flow proceeds to block 628.

In block 628, processor 124 sets the variable DotsNot-Grown counter to zero.

In block 630, processor 124 sets a least significant bit (LSB) of DotShift register to 1.

In block 632, processor 124 sets a DotGrowthFlag to "1" indicating that a dot corresponding to the current pixel (e.g., center pixel 204) will be grown. The flow then proceeds to block 646.

In block 646, the parameter DotsNotGrownLocation is set to 0, indicating for the future detected dots in that scanline that a dot has been grown in some pre-defined neighborhood of the current detected dot. The flow then proceeds to block 606 via block 644 discussed below.

In block 634, processor 124 sets a least significant bit (LSB) of DotShift register to "0".

In block 636, processor 124 sets a DotGrowthFlag to "0" indicating that a dot corresponding to the current pixel (e.g., center pixel 204) will not be grown.

In block 638, processor 124 increments DotsNotGrown counter. The flow then proceeds to block 640.

In block 640, processor 124 determines if DotsNotGrown-Counter is equal to "1". If yes, it indicates that a pixel in the neighborhood of the current detected dot is a first dot that was not grown and is detected as a result of any earlier dot growth logic previously applied on the current pixel (e.g., center pixel 204). The flow proceeds to block 642. If no, it indicates that further initialization in the current scanline is not needed and the flow goes to block 644.

In block 642, processor 124 sets a DotNotGrownLocation variable to current center pixel 204's location.

In block 644, processor 124 carries out a left shift operation in the DotShift register by 1 bit. The flow then goes back to block 606.

The processes described in flowcharts 300-600 may be summarized in Table II below.

Table II illustrates an example with various parameters, variables, and conditions discussed above in flowcharts 300-600. For example, for Table II, for ring16=0, LUT 116 implies DensityVal=2, and LUT 116, PercentageVal=0 which means 50% of the pixels enabled for dotgrowth based on a dot growth algorithm (such as those known to one of ordinary skill in the art) may be selectively enabled based on the examples of dot growth algorithm in accordance with an embodiment. Similarly, for ringNum=1 LUT 116 implies DensityVal=1, and LUT 116, PercentageVal=68 means approximately 40% of the pixels enabled for dotgrowth can be enabled for dotgrowth based on examples of dot growth algorithm in accordance with an embodiment.

TABLE II

| Registers/Variables | Comments | N | N+1 | N+2 | N+3 | N+4 | N+5 | N+6 | N+7 | N+8 | N+9 | N+10 | N+11 | N+12 | N+13 | N+14 | N+15 |
|---|---|---|---|---|---|---|---|---|---|---|---|---|---|---|---|---|---|
| 1. DotGrowth Flag: 1/0 (Block 604) | Dot is to be grown for current center pixel 204 as dictated by a dot growth algorithm | 1 | 0 | 1 | 0 | 1 | 0 | 0 | 1 | 0 | 1 | 0 | 0 | 1 | 0 | 1 | 0 |
| 2. Rand_No (Block 610) | Output of random number generator 122 | 199 | 6 | 12 | 1 | 2140 | 1805 | — | — | 2059 | 1425 | 18 | 10 | 89 | 100 | 200 | 60 |
| 3. Ring16 (Block 608) | Number of ON pixels in neighborhood of current pixel 204 | 0 | 0 | 0 | 0 | 0 | 0 | 0 | 0 | 0 | 0 | 1 | 1 | 1 | 1 | 1 | 1 |
| 4. DotsGrown | Number of dots grown in DotShift register This is the dotCount in block 624 from previous pixel | 1 | 0 | 1 | 1 | 2 | 2 | 2 | 3 | 2 | 3 | 2 | 1 | 1 | 1 | 2 | 1 |
| 5. dotNotGrown Location (Blocks 642, 646 from previous pixel) | | 0 | N | N | 0 | 0 | 0 | 0 | 0 | N+7 | N+7 | N+7 | N+7 | N+7 | 0 | 0 | N+14 |
| 6. DotsNotgrown Counter (Blocks 638, 628) again from previous pixel | | 0 | 1 | 0 | 0 | 0 | 0 | 0 | 1 | 1 | 2 | 2 | 2 | 0 | 0 | 1 | 1 |
| 7. Pixel enabled because of random number (Block 618) | Is Rand_No >= PercentageVal | 0 | 1 | 0 | 0 | 1 | 1 | 0 | 0 | 1 | 1 | 0 | 0 | 1 | 1 | 1 | 0 |
| 8. Pixel enabled with dotNotgrown logic (Block 618) | Is abls(current_pixel-DotNotGrownLocation) <= threshold_distance | 0 | 1 | 1 | 0 | 0 | 0 | 0 | 0 | 1 | 1 | 1 | 1 | 1 | 0 | 0 | 1 |
| 9. Dotdensity (Blocks 620 and 622) | Will be set to either a 1 or 0 based on 7 and 8 above and block 616 Densityvalue comes from the LUT which will be either a 2/1 in this case. | 0 | X | 2 | X | 2 | X | X | 0 | X | 2 | X | X | 1 | X | 1 | X |
| Dotgrowth flag - updated value (Blocks 632, 636) | Will be turned OFF if dotsGrown >dotDensity). | 0 | 0 | 1 | 0 | 1 | 0 | 0 | 0 | 0 | 0 | 0 | 0 | 1 | 0 | 0 | 0 |
| DotsNotgrown Counter - updated value (Blocks 638, 628) | Will be updated based on block 626. | 1 | 1 | 0 | 0 | 0 | 0 | 0 | 1 | 1 | 2 | 2 | 2 | 0 | 0 | 1 | 1 |

TABLE II-continued

| Registers/Variables | Comments | N | N+1 | N+2 | N+3 | N+4 | N+5 | N+6 | N+7 | N+8 | N+9 | N+10 | N+11 | N+12 | N+13 | N+14 | N+15 |
|---|---|---|---|---|---|---|---|---|---|---|---|---|---|---|---|---|---|
| Dots grown - updated value (Blocks 634, 630) | New value of number of counts in dotShift register. Depending on whether it's LSB is set to a 1 or 0. | 0 | 0 | 1 | 1 | 2 | 2 | 2 | 2 | 2 | 2 | 2 | 1 | 1 | 1 | 1 | 1 |
| dotNotGrown Loc - updated value (Blocks 646, 642) | New value based on block 626 | N | N | 0 | 0 | 0 | 0 | 0 | N+7 | N+7 | N+7 | N+7 | N+7 | 0 | 0 | N+14 | N+14 |

For example, as shown in block 616, pixels N+7 and N+9 have an initial value of DotGrowthFlag=1 coming from some prior art dot detection algorithm. For pixel N+7, random number generated is less than PercentageVal (0 in this case for ring16=0) thus turning the DotGrowthFlag OFF. For pixel N+9, random number generated is greater than PercentageVal but number of dots grown in DotCount (Block 626) is greater than the DensityVal (same as DotDensity=2 in this case-block 612), thus turning the DotGrowthFlag OFF. Pixel N+12 satisfies the conditions for random number as well as the local dot density (DotCount) and will be grown only if DotsNotgrownCounter conditions are met with (items 5 and 6 in Table II. DotsNotGrownCounter value is 2 coming from the previous pixel). Table II above shows that dots that were supposed to be grown using some known dotgrowth algorithm are 7 out of a total of 16 in this example (i.e., 7/16). Out of these 7 pixels enabled for dotgrowth, 3 were selectively enabled as a result of DotsNotGrownCounter (3/16). Additionally, out of these 7 pixels enabled for dotgrowth, 4 were selectively enabled as a result of random number generator (4/16) or (4/7), and out of these 7 pixels enabled for dotgrowth, the total number of pixels selectively enabled were 5 (5/16) or (5/7). Thereafter, applying additional logic of dot density control discussed above, dots actually grown finally are three (3) in number, i.e., 3/7 or approximately 42.8% of total number of pixels initially enabled for dotgrowth by some prior art dotgrowth algorithm.

Figure 7:
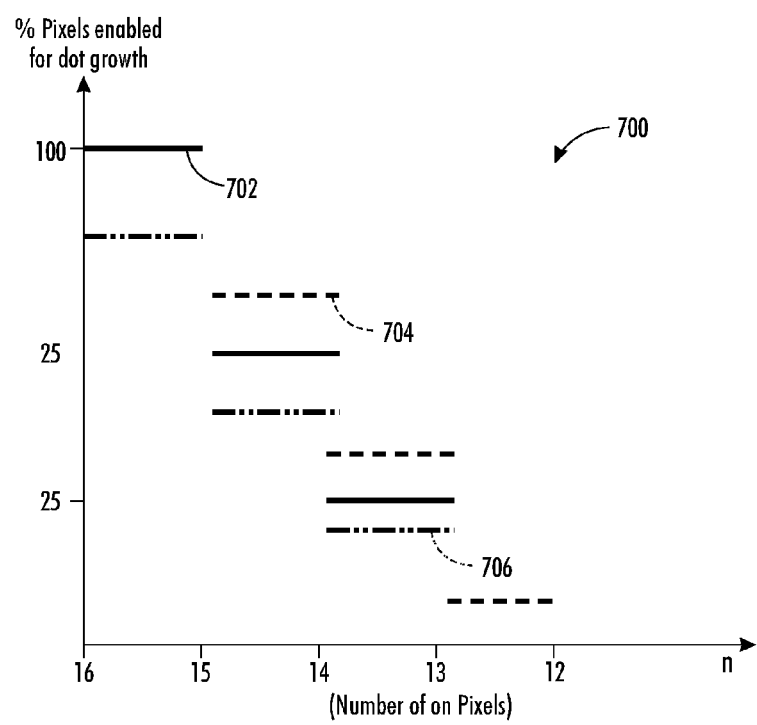
FIG. 7 illustrates an exemplary plot showing different values for enabling pixels in an output image, according to an aspect of the present disclosure.

FIG. 7 illustrates a plot 700 showing flexible dot growth pattern based on one or more conditions described above as a function of a number (n) of pixels surrounding center pixels 204 that are in an ON state. Generally, plot 700 shows a percentage of pixels enabled in the output image for dot growth. The output density is adjusted based upon one or more methodologies illustrated in flowcharts 300-600 as discussed above. For example, line 702 in plot 700 shows percentage of pixels enabled for dot growth using random number generator 122 (e.g., in blocks 610-618). Line 704 illustrates further fine tuning by processor 124 to account for a number and distance of pixels that were enabled for dot growth based on some known growth algorithm but were not grown in a past context of context window 202, as discussed with respect to blocks 616 and 618 in FIG. 6. Likewise, line 706 shows additional fine tuning using the density control value discussed in FIGS. 3-6. As can be seen in plot 700, depending on which technique or combination of techniques that are being used by processor 124 to adjust growth of isolated dots, a particular percentage of pixels in each scanline of the output image will be enabled. For example, if 1-2 pixels surrounding center pixel 204 are in an ON state in the input image, for the output image the number of pixels enabled for dotgrowth will be in a range centered around 50% of total number of pixels in the scanline in one case, by way of example only and not by way of limitation. The range exists since processor 124 adjusts the percentage of pixels depending on which methodology shown in FIGS. 3-6 is used. If only, a random number generator 122 is used by processor 124, then solid line (similar to line 702) closest to the 50% mark indicates the output density of the scanline. Likewise, if only dots not grown in a past context of center pixel 204 is utilized by processor 124, then chained line (similar to line 704) indicates the output density of the scanline. However, since processor 124 may utilize all or more than one methodology, each resulting in a different output density, the final outputted scanline will have an output density that could be a fine tuned or modulated average of the output densities obtained by the methodologies described in FIGS. 3-6. Further, it is to be noted that the ranges/margins of output percentage of pixels enabled is for example purposes only and is not meant to be limiting.

The foregoing aspects of the disclosure have been provided as examples within the scope of the technology disclosed and should not be regarded as limiting. To the contrary, the present disclosure is intended to encompass all modifications, substitutions, alterations, and equivalents within the spirit and scope of the following claims.

What is claimed is:

1. A method for processing isolated dots of an image to be printed by a printer, comprising:
   detecting whether one or more pixels corresponding to an isolated dot in the image are in an on state, the on state defined by a higher binary logic level relative to a binary logic level corresponding to an off pixel;
   determining a first sum of pixels that are in an on state in a first pixel ring surrounding the one or more pixels corresponding to the isolated dot when the one or more pixels in the isolated dot are detected to be in the on state;
   comparing the first sum of pixels in the first pixel ring that are in the on state with a first threshold sum;
   turning on a first number of one or more pixels in at least a second pixel ring either comprising of or surrounding the one or more pixels corresponding to the isolated dot when the first sum of pixels in the on state is less than the first threshold sum, wherein the second pixel ring is inside the first pixel ring; and
   outputting the isolated dot including the turned on first number of pixels in the second pixel ring on a printable medium as an output image.

2. The method of claim 1, wherein both the first and the second pixel ring comprise pixels in at least one of a fast scanning and a slow scanning direction of a scanning device, and wherein the first and the second pixel rings together define a two-dimensional neighborhood of the isolated dot with one dimension corresponding to the fast scanning direction and another dimension corresponding to the slow scanning direction.

3. The method of claim 1 further comprising:
determining one or more pixel distances of one or more pixels in a turned on state nearest to the one or more pixels corresponding to the isolated dot;
comparing each pixel distance to a threshold pixel distance; and
turning on of the first number of one or more pixels in the second pixel ring based upon the comparing such that the turning on is carried out when one or more of the pixel distances are greater than the threshold pixel distance.

4. The method of claim 1 further comprising:
determining using an n-bit counter device a second sum of pixels that are in a turned on state in an m×1 pixel window corresponding to one of a fast scanning or a slow scanning direction of a scanning device for carrying out the printing, the m×1 pixel window starting at a pixel contiguous with the one or more pixels corresponding to the isolated dot, n, m being integers;
comparing the second sum of turned on pixels in the m×1 pixel window to a second threshold sum; and
turning on at least the first number of one or more pixels in the second pixel ring when the second sum of turned on pixels is less than the second threshold sum.

5. The method of claim 1 further comprising:
determining a third sum of pixels, corresponding to a number of dots different from the isolated dot, that are in a turned on state in at least a half scan line in one of a fast scanning and a slow scanning direction;
comparing the third sum of pixels to a third threshold sum; and
turning on at least the first number of one or more pixels in at least the second pixel ring when the third sum of turned on pixels is less than the third threshold sum for carrying out the outputting.

6. The method of claim 5, wherein the third threshold sum is a weighted percentage of pixels in one of the fast scanning or the slow scanning directions that are in anon state with respect to a total number of pixels, the third threshold sum being programmable.

7. The method of claim 1, wherein the turning on at least the first number of pixels includes turning on at least two, at least three, or at least four pixels, of which at least one, at least two, at least three, and at least four pixels is/are contiguous with the one or more pixels corresponding to the isolated dot, such that the turned on first number of pixels become a part of the one or more pixels corresponding to the isolated dot during the outputting.

8. The method of claim 1 further comprising:
turning on a second number of pixels in the first pixel ring when the first sum of pixels in the on state is less than the first threshold sum.

9. A method for processing isolated dots of an image to be printed by a printer, comprising:
detecting whether one or more pixels corresponding to an isolated dot in the image are in an on state, the on state defined by a higher binary logic level relative to a binary logic level corresponding to an off pixel;
determining one or more pixel distances of one or more pixels in a turned on state nearest to the one or more pixels corresponding to the isolated dot;
comparing each pixel distance to a threshold pixel distance; and
turning on a first number of one or more pixels either comprising of or surrounding the detected one or more pixels based upon the comparing such that the turning on is carried out when one or more of the pixel distances are greater than the threshold pixel distance for outputting the isolated dot using an image output device.

10. A method for processing isolated dots of an image to be printed by a printer, comprising:
detecting whether one or more pixels corresponding to an isolated dot in the image are in an on state, the on state defined by a higher binary logic level relative to a binary logic level corresponding to an off pixel;
determining a first sum of pixels, corresponding to a sum of dots different from the isolated dot, that are in a turned on state in at least a half scan line in one of a fast scanning and a slow scanning direction of the image;
comparing the sum of pixels to a threshold sum; and
turning on at least a first number of one or more pixels in at least a pixel ring comprising or surrounding the detected one or more pixels corresponding to the isolated dot when the sum of turned on pixels is less than the threshold sum for outputting the isolated dot using an image output device.

11. A system for processing isolated dots of an image to be printed by a printer, the system comprising:
one or more processors configured to:
detect whether one or more pixels corresponding to an isolated dot in the image are in an on state, the on state defined by a higher binary logic level relative to a binary logic level corresponding to an off pixel;
determine a first sum of pixels that are also in an on state in a first pixel ring surrounding the one or more pixels corresponding to the isolated dot when the one or more pixels in the isolated dot are detected to be in the on state;
compare the first sum of pixels in the first pixel ring that are in the on state with a first threshold sum;
turn on a first number of one or more pixels in at least a second pixel ring either comprising of or surrounding the one or more pixels corresponding to the isolated dot when the first sum of pixels in the on state is less than the first threshold sum, wherein the second pixel ring is inside the first pixel ring; and
output the isolated dot including the turned on first number of pixels in the second pixel ring on a printable medium as an output image.

12. The system of claim 11, wherein both the first and the second pixel ring comprise pixels in at least one of a fast scanning and a slow scanning direction of a scanning device, and wherein the first and the second pixel rings together define a two-dimensional neighborhood of the isolated dot with one dimension corresponding to the fast scanning direction and another dimension corresponding to the slow scanning direction.

13. The system of claim 11, wherein the one or more processors are further configured to:
determine one or more pixel distances of one or more pixels in a turned on state nearest to the one or more pixels corresponding to the isolated dot;
compare each pixel distance to a threshold pixel distance; and
turn on the first number of one or more pixels based upon the comparison such that the turning on is carried out when one or more of the pixel distances are greater than the threshold pixel distance.

14. The system of claim 11 wherein the one or more processors are further configured to:
determine using an n-bit counter device a second sum of pixels that are in a turned on state in an m×1 pixel window corresponding to one of a fast scanning or a slow scanning direction of a scanning device for carrying out the printing, the m×1 pixel window starting at a pixel contiguous with the one or more pixels corresponding to the isolated dot, n, m being integers;
compare the second sum of turned on pixels in the m×1 pixel window to a second threshold sum; and
turn on at least the first number of one or more pixels in the second pixel ring when the second sum of turned on pixels is less than the second threshold sum.

15. The system of claim 11, wherein the one or more processors are further configured to:
determine a third sum of pixels, corresponding to a number of dots different from the isolated dot, that are in a turned on state in at least a half scan line in one of a fast scanning and a slow scanning direction;
compare the third sum of pixels to a third threshold sum; and
turn on at least the first number of one or more pixels in at least the second pixel ring when the third sum of turned on pixels is less than the third threshold sum for carrying out the outputting.

16. The system of claim 15, wherein the third threshold sum is a weighted percentage of pixels in one of the fast scanning or the slow scanning directions that are in an on state with respect to a total number of pixels, the threshold sum being programmable.

17. The system of claim 11, wherein the turning on at least the first number of pixels includes turning on at least two, at least three, or at least four pixels, at least one of which at least two, at least three, and at least four pixels is/are contiguous with the one or more pixels corresponding to the isolated dot, such that the turned on first number of pixels become a part of the one or more pixels corresponding to the isolated dot during the outputting.

18. The method of claim 11, wherein the one or more processors are further configured to:
turn on a second number of pixels in the first pixel ring when the first sum of pixels in the on state is less than the first threshold sum.

19. A tangible computer-readable storage medium having one or more computer-readable instructions thereon for processing isolated dots of an image to be printed by a printer, which when executed by one or more processors cause the one or more processors to:
detect whether one or more pixels corresponding to an isolated dot in the image are in an on state, the on state defined by a higher binary logic level relative to a binary logic level corresponding to an off pixel;
determine a first sum of pixels that are also in an on state in a first pixel ring surrounding the one or more pixels corresponding to the isolated dot when the one or more pixels in the isolated dot are detected to be in the on state;
compare the first sum of pixels in the first pixel ring that are in the on state with a first threshold sum;
turn on a first number of one or more pixels in at least a second pixel ring either comprising of or surrounding the one or more pixels corresponding to the isolated dot when the first sum of pixels in the on state is less than the first threshold sum, wherein the second pixel ring is inside the first pixel ring; and
output the isolated dot including the turned on first number of pixels in the second pixel ring on a printable medium as an output image.

20. The medium of claim 19, wherein both the first and the second pixel ring comprise pixels in at least one of a fast scanning and a slow scanning direction of a scanning device, and wherein the first and the second pixel rings together define a two-dimensional neighborhood of the isolated dot with one dimension corresponding to the fast scanning direction and another dimension corresponding to the slow scanning direction.

* * * * *